United States Patent
Rockenfeller et al.

(10) Patent No.: US 10,619,332 B2
(45) Date of Patent: Apr. 14, 2020

(54) METHOD AND SYSTEM FOR OBTAINING WATER FROM AIR

(71) Applicant: Rocky Research, Boulder City, NV (US)

(72) Inventors: Uwe Rockenfeller, Boulder City, NV (US); Kaveh Khalili, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 15/887,820

(22) Filed: Feb. 2, 2018

(65) Prior Publication Data

US 2019/0242097 A1  Aug. 8, 2019

(51) Int. Cl.
| | | |
|---|---|---|
| *E03B 3/28* | (2006.01) | |
| *B01D 53/26* | (2006.01) | |
| *F25B 49/02* | (2006.01) | |
| *F25B 13/00* | (2006.01) | |
| *B01D 53/30* | (2006.01) | |

(52) U.S. Cl.
CPC .............. *E03B 3/28* (2013.01); *B01D 53/265* (2013.01); *B01D 53/30* (2013.01); *F25B 13/00* (2013.01); *F25B 49/022* (2013.01); *F25B 49/02* (2013.01); *F25B 2700/171* (2013.01); *F25B 2700/172* (2013.01); *F25B 2700/173* (2013.01); *F25B 2700/2104* (2013.01)

(58) Field of Classification Search
CPC ......... E03B 3/28; B01D 53/30; B01D 53/265; F25B 49/022; F25B 13/00; F25B 2700/171; F25B 2700/172; F25B 2700/173; F25B 49/02; F25B 2700/2104
See application file for complete search history.

(56) References Cited

U.S. PATENT DOCUMENTS

| | | | |
|---|---|---|---|
| 4,685,309 | A | 8/1987 | Behr |
| 5,463,876 | A | 11/1995 | Bessler et al. |
| 5,675,982 | A | 10/1997 | Kirol et al. |
| 6,182,453 | B1 | 2/2001 | Forsberg |
| 6,449,972 | B2 | 9/2002 | Pham et al. |
| 6,481,232 | B2 | 11/2002 | Faqih |
| 6,574,979 | B2 | 6/2003 | Faqih |
| 6,705,104 | B2 | 3/2004 | Tani et al. |
| 6,843,064 | B2 | 1/2005 | Khalili et al. |
| 7,043,934 | B2 | 5/2006 | Radermacher et al. |
| 7,121,101 | B2 | 10/2006 | Merritt |
| 7,337,615 | B2 | 3/2008 | Reidy |
| 7,373,787 | B2 | 5/2008 | Forsberg et al. |

(Continued)

OTHER PUBLICATIONS

International Search Report for International Application No. PCT/US2018/065502 dated Mar. 26, 2019.

(Continued)

*Primary Examiner* — Emmanuel E Duke
(74) *Attorney, Agent, or Firm* — Knobbe Martens Olson & Bear LLP

(57) ABSTRACT

Described is a system and method for extracting water from air using a vector drive control system. The water-extraction system may compress ambient air before it comes into contact with an evaporator. The vector drive control system may adjust the speed of one or more motors to increase efficiency and may control a pressure chamber capable of compression and expansion.

20 Claims, 4 Drawing Sheets

(56) References Cited

U.S. PATENT DOCUMENTS

| | | | |
|---|---|---|---|
| 7,886,547 B2 | 2/2011 | Sullivan | |
| 8,627,673 B2 | 1/2014 | Hill et al. | |
| 8,640,472 B2 | 2/2014 | Dieckmann et al. | |
| 9,312,382 B2 | 4/2016 | Gogoi | |
| 9,731,218 B2 | 8/2017 | Waite et al. | |
| 2002/0046569 A1 | 4/2002 | Faqih | |
| 2006/0005561 A1* | 1/2006 | Murphy | B01D 5/0039 62/285 |
| 2006/0101838 A1 | 5/2006 | Ritchey | |
| 2007/0028769 A1 | 2/2007 | Eplee et al. | |
| 2007/0295021 A1* | 12/2007 | Tyls | E03B 3/28 62/285 |
| 2008/0314062 A1* | 12/2008 | Ritchey | B01D 53/265 62/291 |
| 2010/0212348 A1* | 8/2010 | Oh | B01D 5/0006 62/291 |
| 2010/0275779 A1* | 11/2010 | Melikyan | B01D 53/265 95/213 |
| 2011/0048039 A1* | 3/2011 | Kohavi | B60H 1/00414 62/93 |
| 2012/0073320 A1 | 3/2012 | Seoane | |
| 2013/0337120 A1* | 12/2013 | Sabates, III | A47J 31/4403 426/231 |
| 2015/0298053 A1* | 10/2015 | Mai | B01D 53/265 426/66 |
| 2017/0247862 A1 | 8/2017 | Giacomini | |
| 2017/0254053 A1* | 9/2017 | Kumar | E03B 3/28 |
| 2017/0306593 A1* | 10/2017 | Seran | E03B 3/28 |
| 2018/0126325 A1* | 5/2018 | Sher | B01D 53/263 |
| 2018/0171603 A1* | 6/2018 | Di Benedetti | B01D 5/0039 |
| 2018/0209123 A1* | 7/2018 | Bahrami | B01D 5/006 |
| 2018/0369713 A1 | 12/2018 | Dorfman | |

OTHER PUBLICATIONS

Compressed Air and Gas Institute, "Compressed Air and Gas Drying," Aug. 12, 2002, 15 pages.

Niewenhuis et al, "Atmospheric Water Generator Water from Air: Team 5," May 9, 2012, Calvin College, 61 pages.

Tripathi et al., "Atmospheric Water Generator," *International Journal of Enhanced Research in Science, Technology & Engineering*, vol. 5, issue 4, Apr. 2016, pp. 69-72.

* cited by examiner

METHOD AND SYSTEM FOR OBTAINING WATER FROM AIR

BACKGROUND OF THE INVENTION

Field of the Invention

Aspects of the invention relate to systems and methods for efficiently extracting water from air. More particularly, aspects of the invention relate to systems and methods that control the speed and torque of motors to efficiently obtain water from air.

Description of the Related Art

Many different systems have been developed to harvest water from atmospheric air. For example, sorption based and vapor compression-based air dehumidification systems can harvest water from the air. The sorption systems can include liquid desiccants, solid desiccants, or closed cycle absorption devices. Absorption devices can be thermally activated to operate the refrigeration cycle only, requiring power to move air across the device. If an engine is used to provide power, the engine exhaust could be used as the thermal energy source or as part of the thermal energy source.

The four major elements of a vapor compression system are the compressor, condenser, expansion valve, and evaporator. The compressor is used to compress a gaseous refrigerant to a high-temperature, high-pressure vapor state. The refrigerant then flows into a condenser. Because the air flowing over the condenser coils is cooler than the refrigerant, the refrigerant cools to form a high-pressure, somewhat reduced temperature liquid when exiting the condenser. This is typically called the "high side" of the vapor compression cycle. The refrigerant then flows through an expansion valve which controls the conversion of the liquid refrigerant into a gas before entering the evaporator.

In the evaporator, the refrigerant vaporizes at a low temperature, absorbing heat from the environment. When the evaporator is at a lower temperature than the surrounding air and more importantly, below the dew point temperature of the air, water can condense from the ambient air on the evaporator and be extracted for later use. However, many of these systems are inefficient and incapable of working effectively in dry or hot ambient environments.

SUMMARY OF THE INVENTION

One embodiment is a water extraction system that includes an air compression chamber configured to pressurize ambient air to form pressurized air; an evaporator in fluid communication with a refrigerant compressor, a condenser, and a refrigerant expansion valve; a blower configured to move the pressurized air across the evaporator; and a vector drive system configured to control the air pressure within the air chamber to reach a targeted value of water production or energy efficiency.

Another embodiment is a method for extracting water from air using an evaporator in fluid communication with a refrigerant compressor, a condenser, and a refrigerant expansion valve. This method includes measuring the ambient air pressure adjacent the evaporator and controlling the refrigerant compressor and air pressure adjacent the evaporator to reach a targeted value of water production or energy efficiency.

DETAILED DESCRIPTION

Overview

Figure 1:
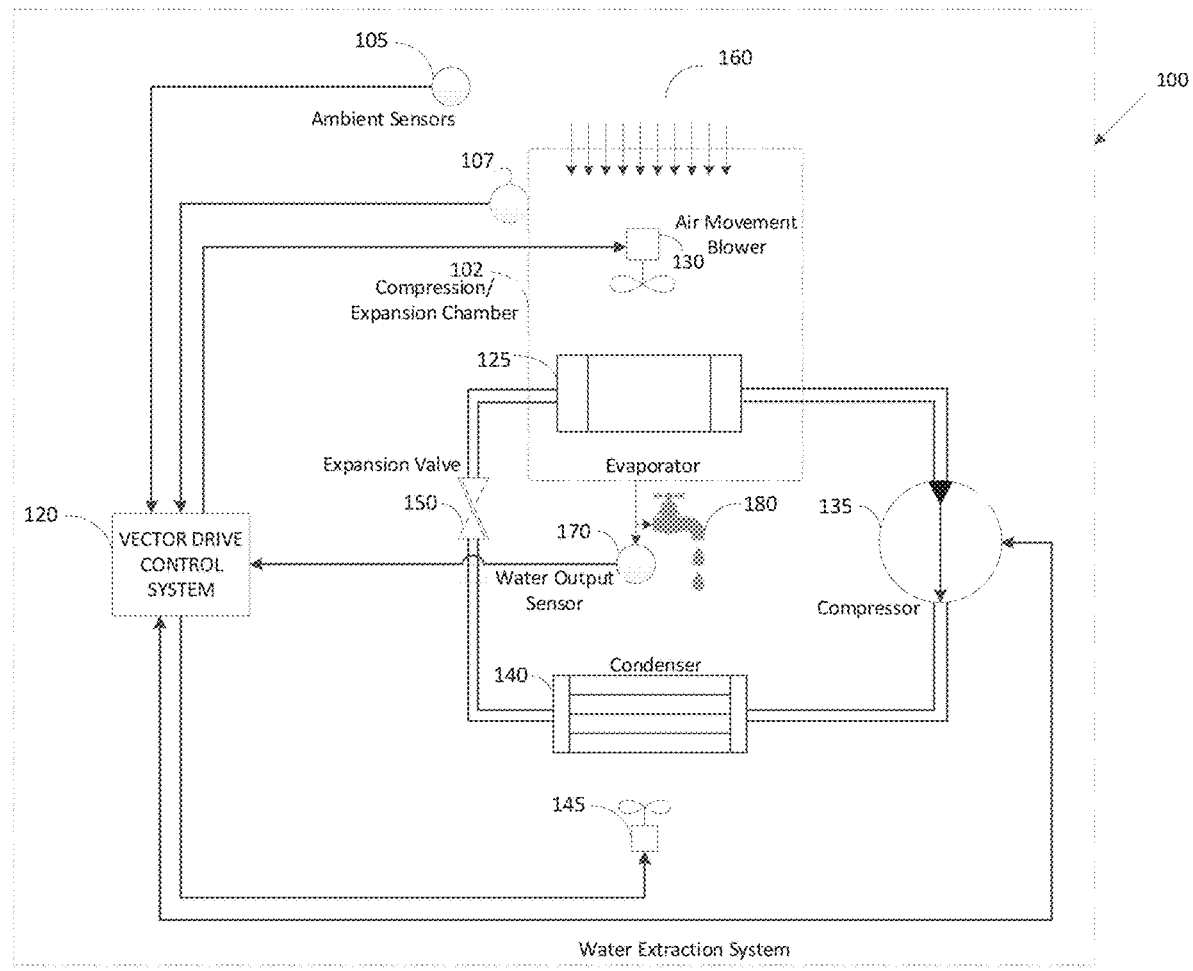
FIG. 1 is a schematic diagram of one embodiment of a water extraction system having a vector drive control system.

Embodiments of the invention relate to high efficiency systems and methods for extracting water from the ambient environment. In one embodiment, the water extraction system uses a vector drive control system to control the speed and torque of multiple motors to manage extraction of water from the air in an efficient manner. The vector drive control system may be programmed to monitor and modulate individual components of a water-extraction system based on operating conditions of the system and those individual components. In one embodiment, the vector drive control system may be set to maximize the overall energy efficiency of extracting water from the air. In another embodiment, the vector drive control system may be set to maximize the amount of water production from the system. These are examples of the vector drive system working to reach a targeted value of water production or energy efficiency. The vector drive control system may be operatively coupled as part of the water-extraction system to control one or more air movement devices, including one or more condenser fans and one or more additional fans or blowers for moving air across an evaporator. In addition, the vector drive control system may be operatively coupled to control one or more air movement compressor/expander systems, one or more variable speed refrigerant compressors, and one or more expansion valves.

Embodiments of a water extraction system may include a means for pressurizing incoming air before the air enters the evaporator of a water harvesting system. For example, ambient air may first enter an air compressor where the air becomes pressurized. In general, compressing air tends to increase the air's temperature and also increase the dew point temperature of the air. The dew point temperature is the temperature to which the air must be cooled before the air becomes saturated with water and moisture will begin to condense for extraction (i.e., dehumidification). For example, compressing ambient air from 14.66 psia to 50 psia increases the dew point temperature of the pressurized air from ~29.8° F. to ~62.2° F. Conversely, expanding the volume of air through decompression lowers the dew point. By controlling the dew point of the ambient air, the system can obtain water condensation from air conditions that would otherwise not be conducive for harvesting water, such as at relatively high air temperatures. In addition, increasing the air temperature via compression may help the system avoid evaporator freezing in instances where the ambient air dew point temperature is at or below the freezing point of water. In this way, the system may avoid energy inefficiency, loss of water harvesting time due to defrost needs, and/or loss of water production capacity.

In one embodiment, a high-efficiency air-compressor may be used to pressurize the incoming air before it enters the evaporator. The ambient air may be actively drawn into the system by the compressor or by a fan, blower, or other well-known air movement device. In a non-limiting example, the air compressor may be configured to increase the air pressure to a range of 30 to 60 psia (2 to 4 atmospheres) depending on ambient conditions, such as air temperature and relative humidity. Of course, the incoming air may be pressurized to other air pressures as well, including increasing the incoming air pressure to 1.5, 2, 2.5, 3, 3.5, 4, 4.5, 5 or greater atmospheres.

In another embodiment, a compression chamber may be used and part of the chamber may include a compressor for drawing in and pressurizing incoming ambient air within the chamber. The compression chamber may be part of a compression/expansion system that is configured to compress incoming ambient air adjacent to an evaporator and then allow the air to expand as it exits the evaporator. The coupling, e.g. shaft coupling, of the compressor and expander allows for recovery of a significant portion of the energy required to compress the air In some embodiments, the system is configured so that the pressurized air moves across the heat transfer surface of the evaporator of the water-extraction system. There, the evaporator is used to cool the air and condense water out of the pressurized air based on an altered dew point. The water will condense when the temperature of the evaporator surface is lower than that of the dew point temperature of the pressurized air. In some embodiments, the evaporator may be included directly within a compression chamber. In other embodiments, the evaporator may be adjacent to the compression chamber. Alternatively, in another embodiment, the evaporator may merely be in contact with a blower or other air compression device that moves air across the evaporator surface to overcome a pressure drop of a heat transfer coil and to move the ambient air at velocities conducive to the needed heat transfer for cooling and dehumidifying the air without any significant compression. For example, if there is no compressor, the evaporator fan or blower may use a variable speed motor controlled by the vector drive control system for optimum system efficiency or maximum water production rate. In some embodiments, an evaporator comprises an air coil wherein the air coil is designed to allow proper condensate generation at the design conditions. In addition, the coil should be able to shed condensate readily and at sufficient condensate per unit area to properly flush the surface of the evaporator.

In some embodiments, the compression chamber may be part of a compression/expansion system configured to intake ambient air, pressurize that air using the compression chamber, and then use the compressed air exiting the compression chamber to do additional work as it expands. Further, the compressor may be connected to an expander via a common shaft. For example, the compression/expansion system may have a common shaft that connects the compression side with the expansion side so that exiting compressed air performs work by rotating the common shaft as the air expands, thereby increasing the efficiency of the overall compression/expansion system.

In some embodiments, because pressurizing air increases its temperature, the compressed air and the expanding air may be thermally connected so that heat from the hotter compressed air may be transferred to the cooler expanding air as a way of reducing the overall temperature of the air within the compression chamber. Similarly, because air compression increases air temperature, a recuperator heat exchanger may be used to precool the compressed air prior to the time that it contacts the evaporator coil of the water-harvesting system. By pre-cooling the compressed air prior to contacting the evaporator, the system may have an increased efficiency since it takes less energy to harvest water from the cooler air that would be closer to the dew point.

In a non-limiting example, the system may include one or more air expanders that expand and cool the air after it leaves the evaporator. By thermally linking the cooled/expanded air to the incoming compressed air, the system may be able to recoup the thermal energy in addition to the recovery of the mechanical energy between the coupled compressor and expander. Thus, thermally connecting the hotter compressed air within the compression chamber and the cooled/compressed air leaving the compression chamber may increase the overall system efficiency.

In some embodiments, the air pressure within the compression/expansion chamber may be managed by at least one vector drive control unit (described in detail below) to dynamically manipulate the air pressure being fed to the evaporator coil. The vector drive control system may receive input from temperature, pressure, and humidity sensors stationed within or nearby the evaporator that provide information as to ambient and air inside the compression chamber conditions. The vector drive control system may use those data inputs to control the efficiency of the system including the pressure of the air surrounding the evaporator in order to efficiently manipulate the dew point of the ambient air entering the evaporator. For example, the vector drive control may read the ambient conditions and then manage the compression/expansion chamber to pressurize the ambient air to increase the dew point temperature above that of the evaporator temperature such that liquid water will condense on the evaporator coils. The increase in the dew point temperature, in turn, reduces the energy required by the refrigeration compressor because the compressed air has a higher dew point and needs less cooling power. The compressor does not need to work as hard to lower the refrigerant pressure to reach a higher evaporator temperature.

Alternatively, based on inputs received from, for example, a power generation device, the refrigerant compressor and the ambient air condition sensors, the vector drive control may control the compression/expansion chamber to decrease the pressure of the ambient air from a previous set-point pressure, thereby lowering the dew point temperature closer to that of the evaporator temperature. In this way, the system along with the vector drive control system can efficiently extract water from the air without unnecessary energy loss.

In one embodiment, the vector drive control system monitors the air temperature and dew point and modulates the air compressor to alter the air pressure adjacent to the evaporator. The vector drive control system may increase the air pressure until a target dew point is reached by calculating a target dew point from the current ambient conditions and thereafter altering the pressure of the air to reach that target dew point. The target dew point may be based on a number of calculations performed by the vector drive control in order to maximize efficiency of the system taking into account operating conditions of individual components within the system.

In some embodiments, the vector drive control system may also control the vapor compression cycle within the water harvesting system to control the refrigerant compressor motor and the condenser fan/motor. For example, in order to maintain maximum efficiency, the vector drive control may use variable speed and torque control to dynamically adjust the refrigerant compressor/motor speed, the pressure of the incoming ambient/moist air, and the condenser fan/motor speed. This allows the system to control the temperature where condensation occurs on the evaporator based on the ambient temperature surrounding the device and the operating conditions of controllable components within the system. The vector drive control system can balance the evaporator and condenser temperature with the ambient temperature and air pressure. In this embodiment, the vector drive control manages the air compression adjacent the evaporator and determines the pressure and the flow of the air from which the water is to be extracted. A higher air flow can result in higher heat transfer coefficients. An increase in air pressure will increase the relative humidity and dew point allowing the vapor compression system to operate at lower compression ratios resulting from elevated evaporator temperature and refrigerant pressure. Alternatively, the vector drive control system may determine that maintaining a relatively low evaporator temperature at an increased air pressure is advantageous because it will allow for more water extraction from a given amount of air, thus increasing capacity of the system.

In some embodiments, the water-harvesting system may employ a mechanical thermal expansion valve (TXV) to modulate the flow of refrigerant through the system. While conventional modulating expansion valves can achieve decompression goals to some extent, pulsing expansion valves can also be used, such as described in U.S. Pat. Nos. 6,843,064 and 5,675,982 (the contents of which are incorporated herein in their entirety). Electronically controlled valves for refrigerant control as described in U.S. Pat. No. 5,463,876 may also be used in embodiments of the invention (the content of which is incorporated herein in its entirety).

In some embodiments, the water-harvesting system may include a water purification system for collecting water from the evaporator coils. For example, the water purification system may include one or more Millipore filters, chlorine drips, carbon polish filters, a mini-pump for pressurization, and/or a liquid level sensor.

In some embodiments, the water-harvesting system may be packaged as a single unit. In another embodiment, the water-harvesting system may be a split unit with the air coil and water purification separate from the refrigeration cycle.

Vector Drive Control System

Specific programmed processes within the vector drive control system may be configured to expand the one-dimensional speed control of a vapor compression system into a two-dimensional speed and torque control system. Incorporating torque control into the system allows for optimal use of a compressor motor to increase the overall system efficiency. The vector drive control system may control motors within the system such as a refrigerant compressor motor, an air compressor motor as well as fan and blower motors within a vapor compression system. The vector drive control system optimization process can take into account characteristics of the vapor compression motor's performance as a function of speed, compression ratio and absolute pressures. The vector drive control system may also take into account other system motors in the system to improve the efficiency of condenser fan(s) and in some cases evaporator fans or blowers or air compressors. Vector drive control may constitute a two-dimensional energy efficiency optimization incorporating refrigerant flow as well as high side (condenser) air flow and, in some instances low side (evaporator) air flow, deriving the best system energy efficiency obtainable at any given load and temperature condition for achieving the desired water harvesting efficiency.

In one embodiment, the vector drive control system may use an artificial intelligence platform to control the system components. In another embodiment, the vector drive control system may be pre-programmed by a combination of data tables, charts or graphs to manage the various components of the system for a targeted result or to reach a targeted value.

Control of the water-extraction system for a desired outcome may be managed by controlling several individual components of the system based on sensor inputs. For example, in one embodiment the vector drive control system of a water extraction system may continuously monitor the ambient temperature, air pressure at the evaporator, ambient dew point, compressor speed, fan speeds and other individual components. From that data gathered by sensors and system components, the vector drive control can manage the system for a predetermined target result. For example, the vector drive control system may control the speed of the variable speed compressor within the system to manage the amount of cooling provided to the evaporator to reach a targeted value of energy efficiency. Similarly, a sensor that measures the amount of water produced by the system may be used as an input to the vector drive control system to control the speed of the variable speed compressor to reach a target level of water production.

In one example, a water extractor operating condition that conventionally calls for a certain predetermined compressor speed at a set condition is improved by operating the compressor at a lower torque setting while using the same refrigerant flow. Although the system would be using less torque, the resultant cooling capacity would remain the same because the refrigerant flow through the vapor compression circuit does not change. The lower compressor torque could be achieved by increasing the airflow of a condenser fan. This increased airflow would lower the condenser temperature and pressure which may decrease the torque required by the compressor to compress the refrigerant. Depending on the compressor motor and condenser fan characteristics, the additional energy required to increase the fan speed could be less than the energy saved by reducing the torque on the compressor. Thus, in this embodiment, the vector drive control system would evaluate the energy required to increase the condenser fan speed and balance that against the energy saved by lowering the torque on the compressor. If the energy saved by reducing the torque on the compressor was greater than the energy required to increase the fan speed, then the vector drive control system may increase the condenser fan to save energy overall. Similarly, the air compressor or air compressor/expander can be employed to increase the air pressure, and thus the dew point temperature, which in turn allows for a higher evaporator temperature.

In other embodiments, reducing the compressor torque may reduce the overall efficiency if the energy required to increase the speed of the condenser fan is more than the energy required to operate the compressor at a higher torque. Thus, the vector drive control system can vary different components in different systems within the vapor compression circuit to increase the overall system efficiency by modulating the torque placed on different motors and by adjusting the speed of the various motors to give the optimum target value of energy efficiency.

In order to achieve such performance advantages, the performance characteristics as a function of speed and torque for all the subject motor systems is first determined. Commonly these motors include the compressor, condenser fan(s) or condenser blower(s) and at times evaporator fan(s) or evaporator blower(s) and air compressor/expanders.

TABLE 1

Exemplary Motor Characteristics

|  | Compressor Motor | Blower Motor | Condenser Motor |
|---|---|---|---|
| Voltage (VAC) | 208-230 | 208-230 | 208-230 |
| Torque (lb · in) | 175 | 17.5 | 26.2 |
| Speed (RPM) | 1800 | 3600 | 3600 |
| Power (HP) | 5 | 1 | 1.5 |

Once the characteristics of these motors are established they can be entered into the appropriate equations, approximations or tables, as indicated below. The vector drive control system then uses these equations, approximations and tables as input parameters to determine how to control the various vapor compression system motors under a given running condition. A properly optimized system would include consideration of all motor/compressor, motor/fan, ambient temperature, humidity, and load conditions to determine the best operating mode to run the system with the highest efficiency. Such a process may also include consideration of the operating frequencies for compressor motor(s) and fan motors to achieve higher capacities, often referred to as peak capacities, by overclocking motor operating frequencies. However, it should be realized that such overclocking does not always achieve a higher overall energy efficiency but instead is implemented to achieve a temporary peak capacity to overcome adverse operating conditions.

Additionally, the vector drive control system can include further energy efficiency realization during transients when the speed of the motors is changed. This can occur when the operating frequency is less than a nominal frequency. Transients can be induced by changing temperature, changing loads, and starts and stops. When the vector drive control system is used to start or change the speed of one or more motors, a low frequency, low voltage power signal is initially applied to each motor. In some embodiments, the frequency may be about 2 Hz or less. Starting at such a low frequency allows the capacity to be driven within the capability of the motor, and avoids the high inrush current that occurs at start up, or transients that occur with the constant frequency and voltage power supply. The vector drive control system is used to increase the frequency and voltage to the motor using a pre-programmable time profile stored within the system that accounts for torque and speed characteristics of the motor, which keeps the acceleration of the capacity within the capability of the motor. As a result, the capacity is accelerated without drawing excessive current. This starting method allows a motor to develop about 150% of its rated torque while drawing only about 50% of its rated current. As a result, the vector drive control allows for reduced motor starting current from the AC power source, reducing operational costs, placing less mechanical stress on the compressor motor, and increasing service life. The vector drive control also allows for programmable control of acceleration and deceleration of the capacity in its quest to track the load. In cases where power is generated by an external local generator, the avoidance of in-rush currents reduces the demand on the generator capacity requirements and thus the generator equipment size.

In order to effectively achieve energy efficiency gains, the multi-motor control also can provide an accurate refrigerant flow control. This is best achieved with active refrigerant expansion devices that can actively alter the refrigerant flow. While conventional modulating expansion valves can achieve such goal to some extent, pulsing expansions valves can also be used, such as described in U.S. Pat. Nos. 6,843,064 and 5,675,982. Electronically controlled valves for refrigerant control as described in U.S. Pat. No. 5,463,876 may also be used in embodiments of the invention.

In one embodiment, the high-efficiency water extraction system may be configured to utilize power received from Alternating Current (AC) or Direct Current (DC) power sources. In one embodiment, the system may be configured to receive both AC and DC power. The system may utilize both AC and DC current at the same time. The system may also have the capability to convert from one form of power to the other by performing an AC-DC power conversion or a DC-AC power conversion. Furthermore, the system may be capable of manipulating the voltage to be higher or lower depending on the system requirements. For example, the system may use step-up (e.g., boost), step-down converters (e.g., buck), or transformers.

System Description

FIG. 1 shows an exemplary vector-controlled water extraction system 100. The system includes a vector drive control system 120 configured to control operation of the various components of the water extraction system 100. The water extraction system 100 may include a compression/expansion chamber 102, an evaporator 125, an air movement blower 130, a compressor 135, a condenser 140, a condenser fan 145, an expansion valve 150, one or more ambient air sensors 105, and a water output sensor 170. The water extraction system 100 may also include a collection device 180 for collecting water that condenses on the evaporator 125.

The vector drive control system 120 includes electrical connections to one or more ambient air sensors 105, one or more water output sensors 170, the compressor 135, the compression/expansion chamber 102, the condenser fan 145, the evaporator 125, and the air movement blower 130. The vector drive control system 120 receives input from sensors 107 adjacent the evaporator regarding conditions within and/or near the evaporator.

The sensors 105 and 107 may be configured to collect, analyze, store, and/or relay information to the vector drive control system 120 regarding ambient air conditions (e.g., humidity, temperature, speed, etc.) along with data regarding conditions adjacent or inside the system. For example, the ambient air sensor 105 may be configured to read the current temperature and humidity outside of the system 100 and return that data to the vector drive control system 120 for processing. As discussed above, the vector drive control system 120 can use the temperature and humidity to adjust the various component operations of each motor within the system to maximize the efficiency of the system 100 or maximize the production of water from the system 100. The vector drive control system may also be configured to balance efficiencies between these two operational goals.

The vector drive control system 120 connects to a condenser fan 145 that is located adjacent a condenser 140. The condenser fan 145 is positioned to increase or decrease the amount of air flow over the condenser 140 as controlled by the vector drive control system 120. Condensing fan motors are normally either single-phase or three-phase motors and usually operate at 240 volts. The vector drive control system is designed to work with all conventional condenser fans. In addition, the condenser fan 145 may be capable of speed control such that the speed of the motor within the condenser fan 145 is configurable depending on the control signal outputs from the vector drive control system 120.

Sensor 170 can be a capacitance and/or resistance type sensor that measures the water level. In addition, a weight measure may be added to measure the rate of water production. The level sensor is used to turn the water production on and off whereas the weigh scale may be used to measure the water production rate over time. These measurements are used as a closed feedback control for the system control.

A water purification system and storage device 180 may be employed to minimize the growth of mold and other contaminants from the water vapor. In some embodiments, the water purification system 180 may include a gravity fed filter, or utilize chlorine injection, or a carbon filtration system. The extracted water may be bottled or transported via pipes to a separate location.

The water extraction system 100 also includes the compressor 135 that is controllable by the vector drive control system 120. The compressor 135 may be a single-phase or three-phase compressor. In some embodiments, the compressor is a variable speed compressor that uses frequency modulation to adjust power output of the compressor motor. This control allows the compressor to speed up or slow down according to the requirements of the vector-controlled water extraction system 100. The ability to adjust speed and power requirements of the compressor 135 can increase the overall system efficiency since the compressor 135 can run at the proper capacity for a given load instead of toggling on or off to maintain the desired temperature or pressure. For example, the compressor may relay information, such as operating conditions (e.g., internal temperature and pressure, speed, torque, etc.), to the vector drive control system such that the vector drive control system may calculate, based on the system requirements, what the input requirements to the compressor should be at any given time.

The water extraction system 100 also includes the evaporator 125 located adjacent the air movement blower 130. In an example, the blower 130 is configured to compress the ambient air to a desired pressure and then move air across the evaporator coils. The vector drive control system 120, receiving inputs from various components, may target a desired pressure within the chamber 102 (described below) such that the dew point temperature of the pressurized air is maintained at a level above the evaporator temperature but not so high that frost or ice forms on the evaporator coils. The motor within the blower 130 may be a single speed or variable speed motor. For example, the vector drive control system may control the blower using pulse-width modulation and/or one or more feedback loops.

Located between the condenser 140 and the evaporator 125 is an expansion valve 150 that expands the coolant from the condenser back into a gas to be directed to the evaporator 125 and complete the refrigeration cycle within the HVAC system The expansion valve may be a pulsing expansion valve that can accurately control the refrigerant without overshooting and hunting during dynamic operating conditions. One type of pulsing expansion valve can be found in U.S. Pat. No. 6,843,064, issued Jan. 18, 2005 which is hereby incorporated by reference in its entirety.

Figure 2:
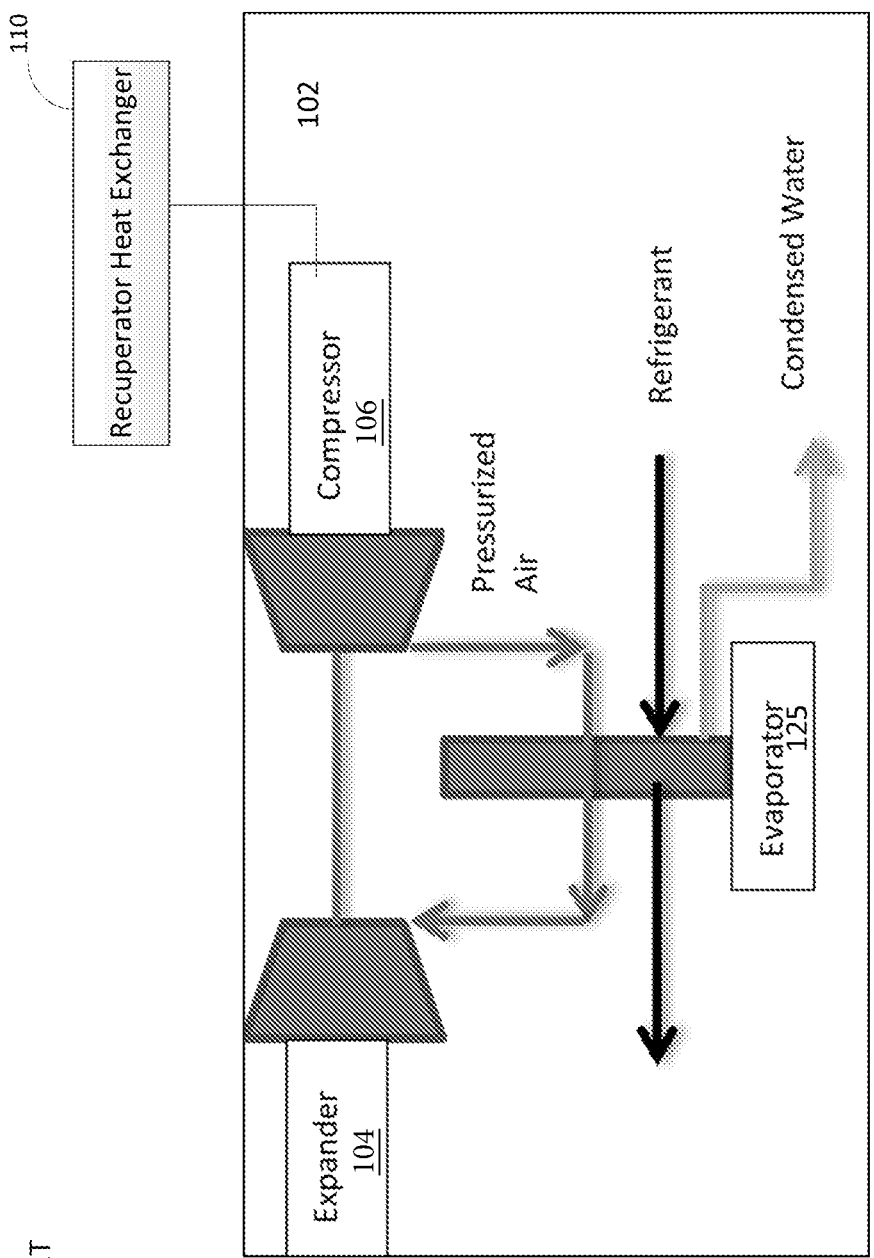
FIG. 2, is a schematic diagram of the compression/expansion chamber 102 from the water extraction system of FIG. 1.

The water extraction system 100 may also include an air compression/expansion chamber 102 shown in more detail in FIG. 2. The compression/expansion chamber 102 may be a separate chamber or may, in the alternative, include components of the system (e.g., the evaporator 125 and air movement blower 130), as shown. The compression/expansion chamber 102 may include additional the temperature, pressure, and humidity sensors 107 for relaying information to the vector drive control system 120 regarding conditions within the chamber 102. The compression/expansion chamber 102 may compress the ambient air 160 or expand the space within the chamber in order to relieve pressure within the chamber. For example, the compression/expansion chamber may include a compressor 106 that pressurizes the ambient air before it enters the air movement blower 130. The air movement blower 130 may then blow the pressurized air across the evaporator 125. The air movement blower 130 may be part of the compression/expansion chamber, or separate from it. Alternatively, the chamber may only include the air movement blower 130. As such, the evaporator 125 may be positioned adjacent to the chamber 102 such that compressed air may still be blown across the evaporator 125. The compression/expansion chamber 102 may include a separator wherein pressurized air may be expanded after entering the evaporator coils. Alternatively, the compression chamber may include an air compressor 106 coupled to an expander 104 connected by a common shaft. Once the compressed air has passed through the evaporator, it may be expanded and hence cooled through the expander 104.

In one embodiment, a recuperator heat exchanger 110 is used to pre-cool the compressed air before the air contacts the evaporator. Compression of air, such as by the compression/expansion chamber 102, may increase the air temperature. Similarly, expansion of air may result in a reduced air temperature. In one embodiment, a recuperator heat exchanger 110 is positioned between the air flow entering the compression/expansion chamber, and air that is exiting the compression/expansion chamber so that the exiting air may cool the air that enters the chamber.

The vector drive control system 120 may control the pressure within the compression/expansion chamber 102, the compressor 135, the air movement blower 130, and the condenser fan 145 based on signals received from components within the water extraction system 100 and the ambient air sensors 105 and the water output sensor 170. The vector drive control system 120 may also receive input corresponding to a particular target operation for the device. For example, the target operation may be a target water production level within a certain power consumption level. The vector drive control system 120 may adjust each component in real-time in order to satisfy the target operation.

Figure 3:
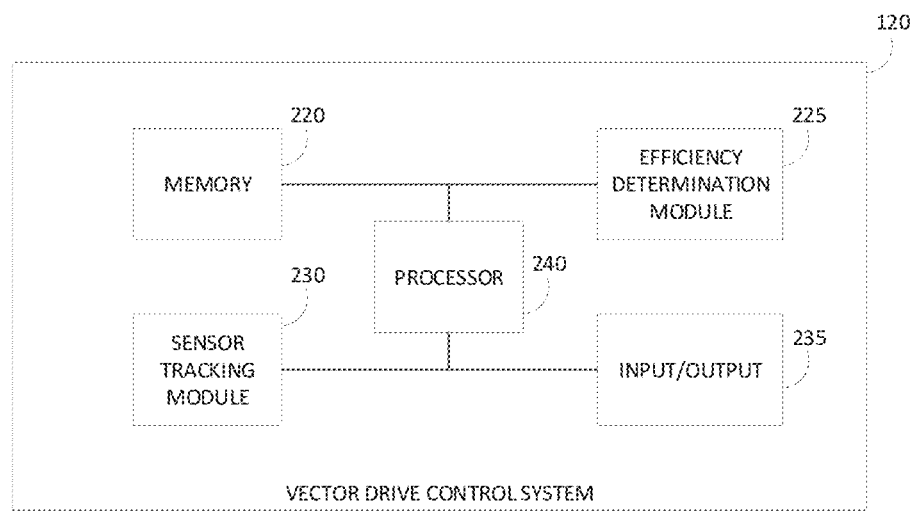
FIG. 3 is a schematic diagram of a vector drive control system according to one embodiment of the invention.

FIG. 3 shows more details on the vector drive control system 120. As illustrated, the vector drive control system 120 includes a memory 220 configured to store data relating to the operation of the vector drive control system 120. For example, the memory 220 may store state tables or lookup tables used by the vector drive control system 120 to configure each of the motors within the system depending on a particular temperature or humidity ratio. One such table is shown below as Table 2. As per Table 2, the vector drive control of the device is determined based on water production rate, condenser temperature and water temperature. As used in Table 2, "frequency" refers to the compressor motor speed in Hertz. "Qc" is the cooling or refrigeration power of the system measured in Watts. "Draw" is the power draw of the system, which measures how much electrical power is consumed by the compressor motor in Watts.

TABLE 2

Example Lookup Table

| Frequency | Condenser Temp (° F.) | Evaporator Temp (° F.) | Qc (W) | Draw (W) | COP |
|---|---|---|---|---|---|
| 60 | 90 | 50 | 6155 | 819 | 7.5 |
| 50 | 90 | 50 | 5047 | 623 | 4.5 |
| 40 | 90 | 50 | 4138 | 734 | 5.6 |
| 60 | 90 | 45 | 5539 | 1674 | 3.3 |
| 50 | 90 | 45 | 4542 | 651 | 4.0 |
| 40 | 90 | 45 | 3724 | 750 | 5.0 |
| 60 | 90 | 40 | 4953 | 1704 | 2.9 |
| 50 | 90 | 40 | 4061 | 673 | 3.5 |
| 40 | 90 | 40 | 3330 | 764 | 4.4 |
| 60 | 100 | 50 | 5832 | 1914 | 3.0 |
| 50 | 100 | 50 | 4782 | 1308 | 3.7 |
| 40 | 100 | 50 | 3922 | 858 | 4.6 |
| 60 | 100 | 45 | 5246 | 1944 | 2.7 |
| 50 | 100 | 45 | 4302 | 1328 | 3.2 |
| 40 | 100 | 45 | 3527 | 871 | 4.0 |
| 60 | 100 | 40 | 4689 | 1968 | 2.4 |
| 50 | 100 | 40 | 3845 | 1345 | 2.9 |
| 40 | 100 | 40 | 3153 | 882 | 3.6 |
| 60 | 80 | 50 | 6506 | 1378 | 4.7 |
| 50 | 80 | 50 | 5335 | 942 | 5.7 |
| 40 | 80 | 50 | 4375 | 618 | 7.1 |
| 60 | 80 | 45 | 5832 | 1424 | 4.1 |
| 50 | 80 | 45 | 4782 | 973 | 4.9 |
| 40 | 80 | 45 | 3922 | 638 | 6.1 |
| 60 | 80 | 40 | 5217 | 1460 | 3.6 |
| 50 | 80 | 40 | 4278 | 998 | 4.3 |
| 40 | 80 | 40 | 3508 | 654 | 5.4 |

The memory 220 is electrically connected to an efficiency determination module 225 that is configured to read the data stored in the memory 220 and determine how to adjust motors with the vapor compression system. The efficiency determination module 225 may include information on the type of motors within the vapor compression system and how they can be adjusted to meet a particular target efficiency level. A sensor tracking module 230 that is connected to an I/O port 235 may be part of the VCS 120, which is all running under the control of a processor 240. The processor 240 may be configured by the efficiency determination module 225 to determine the proper settings for each motor within a vapor compression system.

Figure 4:
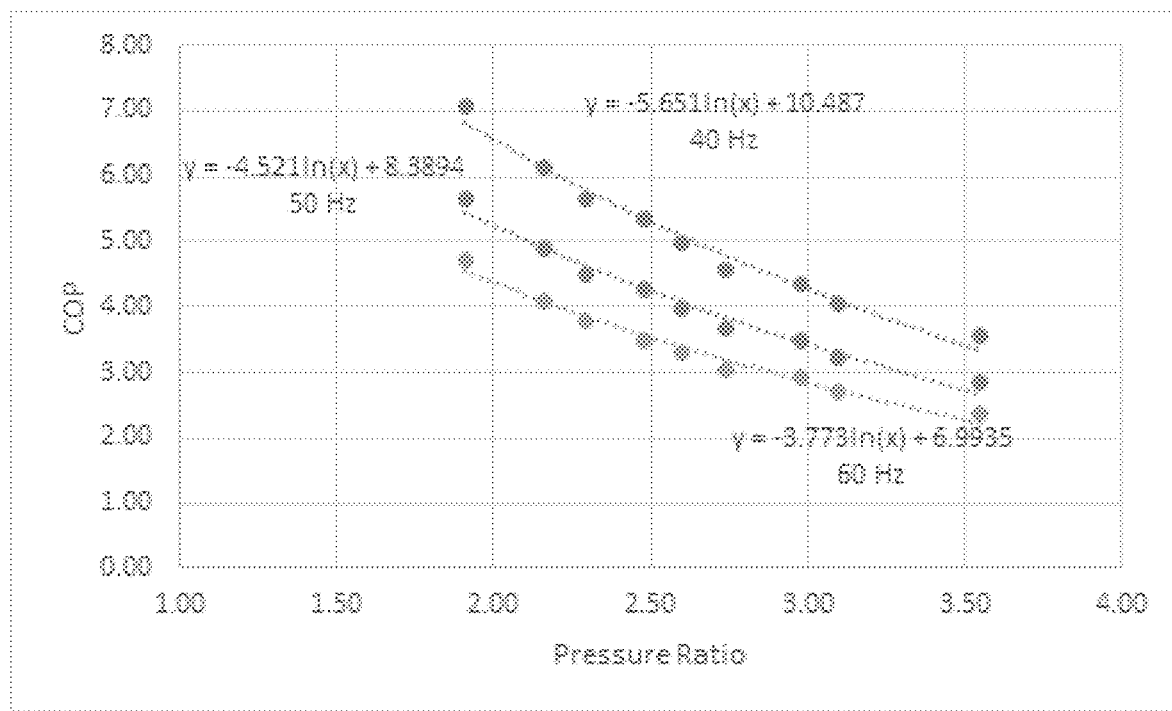
FIG. 4 is a line graph that illustrates two-dimensional control of speed and torque using a vector drive control system when applied to a compressor motor.

FIG. 4 is a line graph that illustrates two-dimensional control of speed and torque using a vector drive control System when applied in practice to a compressor. The X-Axis is a pressure ratio defined as ratio of high side pressure to low side pressure of the compressor in a vapor compression system. The Y-axis is a Coefficient of Performance (COP) ratio of heating or cooling capacity to work required. As shown, with vector drive control technology in place the maximum compressor efficiency can be achieved when motor speed and torque are controlled and varied at the same time. In the example shown the compressor speed measured at 60 Hz, 50 Hz and 40 Hz and data points were taken at eight different pressure ratios for each frequency. The goal to achieve the highest efficiency was accomplished by applying the correct voltage/torque to the motor at lower pressure loads. This resulted in the optimal COP versus pressure ratio.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A water extraction system, comprising:
   an air compression chamber configured to pressurize ambient air to form pressurized air;
   an evaporator in fluid communication with a refrigerant compressor, a condenser, and a refrigerant expansion valve;
   a blower configured to move the pressurized air across the evaporator; and
   a vector drive control system configured to control the air pressure within the air chamber to reach a targeted value of water production or energy efficiency.

2. The water extraction system of claim 1, wherein the refrigerant compressor is a variable speed refrigerant compressor operatively coupled to and controlled by the vector drive control system.

3. The water extraction system of claim 2, wherein the compression chamber comprises one or more internal air condition sensors, and wherein the speed of the variable speed air compressor is controlled based on input received from the internal air condition sensors.

4. The water extraction system of claim 1, wherein the vector drive control system is configured to manage the speed of the variable speed compressor to control the temperature of the evaporator.

5. The water extraction system of claim 1, wherein the air compression chamber includes an air compressor configured to pressurize the ambient air.

6. The water extraction system of claim 5, wherein the air compressor is a variable speed air compressor operatively coupled to and controlled by the vector drive control system.

7. The water extraction system of claim 1, wherein the compression chamber includes an air expander coupled to the compressor configured to depressurize the pressurized air after being blown across the evaporator.

8. The water extraction system of claim 1, further comprising a recuperator heat exchanger configured to reduce the temperature of the pressurized air prior to being blown across the evaporator.

9. The water extraction system of claim 1, wherein the vector drive control system is configured to adjust the speed of an evaporator fan based on a temperature sensor input.

10. The water extraction system of claim 1, wherein the vector drive control system is in communication with an ambient temperature sensor.

11. The water extraction system of claim 10, wherein the vector drive control system is configured to receive data from the ambient temperature sensor and control the compression of air in the air compression chamber to reach a predetermined dew point.

12. The water extraction system of claim 1, wherein the vector drive control system is configured to measure the amount of water exiting the water extraction system.

13. The water extraction system of claim 1, wherein the vector drive control system is configured to control the speed of the variable speed compressor based on the amount of water exiting the water extraction system to reach the predetermined water production target threshold.

14. A method for extracting water from air using an evaporator in fluid communication with a refrigerant compressor, a condenser, and a refrigerant expansion valve, comprising: measuring air pressure adjacent the evaporator; and controlling, using a vector drive control system, the refrigerant compressor and air pressure adjacent the evaporator to reach a targeted value of water production or energy efficiency.

15. The method of claim 14, wherein controlling the refrigerant compressor comprises controlling a variable speed motor in the refrigerant compressor.

16. The method of claim 15, wherein the speed of the variable speed motor is changed to alter the temperature of the evaporator to a target temperature.

17. The method of claim 14, wherein controlling the air pressure comprises controlling the pressure of air within a compression chamber surrounding the evaporator.

18. The method of claim 14, further comprising controlling a blower motor that moves the air.

19. The method of claim 14, wherein the method is performed by a processor in a vector drive control system.

20. The method of claim 19, wherein the vector drive control system is programmed to receive data from an ambient temperature sensor and control the compression of air adjacent the evaporator to reach a predetermined dew point or pressure.

* * * * *